(12) United States Patent
Lee et al.

(10) Patent No.: US 12,006,958 B2
(45) Date of Patent: Jun. 11, 2024

(54) RIVET FASTENER ASSEMBLY AND METHOD OF USE THEREOF

(71) Applicant: ILLINOIS TOOL WORKS INC., Glenview, IL (US)

(72) Inventors: Joel R. Lee, Peotone, IL (US); Mark O. Lepper, Oak Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 265 days.

(21) Appl. No.: 17/704,320

(22) Filed: Mar. 25, 2022

(65) Prior Publication Data

US 2022/0213914 A1 Jul. 7, 2022

Related U.S. Application Data

(63) Continuation of application No. 16/243,808, filed on Jan. 9, 2019, now abandoned.

(60) Provisional application No. 62/617,654, filed on Jan. 16, 2018.

(51) Int. Cl.
  *F16B 13/06* (2006.01)
  *F16B 13/08* (2006.01)
  *F16B 19/10* (2006.01)

(52) U.S. Cl.
  CPC ........ *F16B 13/0808* (2013.01); *F16B 13/061* (2013.01); *F16B 19/1054* (2013.01); *F16B 13/068* (2013.01); *F16B 19/1072* (2013.01)

(58) Field of Classification Search
  CPC ... F16B 13/061; F16B 13/086; F16B 13/1054
  USPC ................................... 411/32–34, 38, 45–48
  See application file for complete search history.

(56) References Cited

U.S. PATENT DOCUMENTS

| | | | |
|---|---|---|---|
| 1,161,155 A | 11/1915 | Pleister | |
| 2,236,079 A * | 3/1941 | Wipper | ................. F16B 13/061 |
| | | | 411/38 |
| 2,324,142 A | 7/1943 | Eklund | |
| 2,964,989 A | 12/1960 | Croessant | |
| 3,136,203 A | 6/1964 | Davis | |
| 3,236,143 A | 2/1966 | Wing | |
| 3,279,304 A | 10/1966 | Hopkins | |
| 3,512,448 A | 5/1970 | Summerlin | |
| 3,789,727 A | 2/1974 | Moran | |
| 3,858,479 A | 1/1975 | Sekhon | |
| 3,888,156 A | 6/1975 | Fima | |

(Continued)

FOREIGN PATENT DOCUMENTS

| | | |
|---|---|---|
| CN | 1521412 A | 8/2004 |
| CN | 201428676 Y | 3/2010 |

(Continued)

OTHER PUBLICATIONS

Examination Report for German Patent Application No. 10 2019 101 078.0, dated Dec. 1, 2020—no translation available (10 pages).

(Continued)

*Primary Examiner* — Flemming Saether
(74) *Attorney, Agent, or Firm* — Quarles & Brady LLP

(57) ABSTRACT

A rivet fastener assembly is configured to securely clamp together one or more components. The rivet fastener assembly includes a pin and a rivet body having a collar and a column extending from the collar. The rivet body further includes a collar stop configured to provide a positive locating feature for the pin once assembled.

20 Claims, 16 Drawing Sheets

FIG. 7

(56) References Cited

U.S. PATENT DOCUMENTS

| | | | |
|---|---|---|---|
| 3,984,132 A | 10/1976 | Sarson | |
| 4,211,145 A | 7/1980 | Dolch | |
| 4,285,265 A | 8/1981 | Rieper | |
| 4,475,856 A | 10/1984 | Toomingas | |
| 4,541,761 A | 9/1985 | Bryce, Jr. | |
| 4,556,351 A | 12/1985 | Wollar et al. | |
| 4,585,382 A | 4/1986 | Bryce, Jr. | |
| 4,610,587 A | 9/1986 | Wollar et al. | |
| 4,639,175 A | 1/1987 | Wollar | |
| 4,642,009 A | 2/1987 | Fischer | |
| 4,708,553 A | 11/1987 | Braychak et al. | |
| 4,863,325 A | 9/1989 | Smith | |
| 4,875,815 A | 10/1989 | Phillips, II | |
| 4,890,966 A | 1/1990 | Umezawa | |
| 5,018,919 A | 5/1991 | Stephan | |
| 5,205,688 A | 4/1993 | Sundstrom | |
| 5,207,750 A | 5/1993 | Rapata | |
| 5,244,324 A | 9/1993 | Smith | |
| 5,690,454 A | 11/1997 | Smith | |
| 5,725,341 A | 3/1998 | Hofmeister | |
| 6,551,040 B1 | 4/2003 | Terry | |
| 6,609,866 B2 | 8/2003 | Huang et al. | |
| 6,719,509 B1 | 4/2004 | Huang et al. | |
| 6,746,191 B2 | 6/2004 | Edland | |
| 6,761,520 B1 | 7/2004 | Dise | |
| 6,835,038 B2 | 12/2004 | Benito-Navazo | |
| 6,969,220 B2 | 11/2005 | Anquetin | |
| 7,621,950 B1 | 11/2009 | Globerman et al. | |
| 7,887,273 B2 | 2/2011 | Vigliotti et al. | |
| 8,602,703 B1 | 12/2013 | Rich | |
| 8,728,160 B2 | 5/2014 | Globerman et al. | |
| 8,931,988 B2 | 1/2015 | Shimizu et al. | |
| 9,062,703 B2 | 6/2015 | Schneider et al. | |
| 9,188,144 B2 | 11/2015 | Sano et al. | |
| 9,309,906 B2 | 4/2016 | Hsu | |
| 9,453,524 B2 | 9/2016 | Sisto | |
| 10,215,210 B2 | 2/2019 | Busby | |
| 2002/0154963 A1 | 10/2002 | Jennings et al. | |
| 2005/0013678 A1 | 1/2005 | Smith | |
| 2006/0182512 A1 | 8/2006 | Williams | |
| 2007/0059120 A1 | 3/2007 | Vigliotti et al. | |
| 2013/0243542 A1 | 9/2013 | Saltenberger et al. | |
| 2014/0377030 A1 | 12/2014 | Dunford et al. | |
| 2018/0238371 A1 | 8/2018 | Cochard et al. | |
| 2019/0219086 A1 | 7/2019 | Lee et al. | |
| 2019/0264722 A1 | 8/2019 | Lee et al. | |
| 2020/0116184 A1 | 4/2020 | Lee | |

FOREIGN PATENT DOCUMENTS

| | | |
|---|---|---|
| CN | 202165364 U | 3/2012 |
| DE | 102010002847 A1 | 9/2011 |
| DE | 102011106436 A1 | 1/2013 |
| DE | 202013005407 U1 | 6/2013 |
| DE | 102014104539 A1 | 10/2015 |
| EP | 0691479 A | 1/1996 |
| EP | 1728569 A1 | 12/2006 |
| GB | 2185081 A | 7/1987 |
| GB | 2412417 A | 9/2005 |
| WO | 2011094056 A1 | 8/2011 |
| WO | 2018031168 A1 | 2/2018 |

OTHER PUBLICATIONS

International Search Report for PCT/US2017/041636, dated Oct. 5, 2017. (11 pages).

First Office Action from corresponding Chinese Patent Application No. 201780048642.0, dated May 22, 2020 (16 pages).

* cited by examiner

RIVET FASTENER ASSEMBLY AND METHOD OF USE THEREOF

CROSS REFERENCE TO RELATED APPLICATIONS

This application is a continuation of U.S. application Ser. No. 16/243,808, filed on Jan. 9, 2019, and entitled "Rivet Fastener Assemblies," which itself claims priority to and incorporates by reference U.S. Provisional Application Ser. No. 62/617,654, filed on Jan. 16, 2018, and entitled "Rivet Fastener Assemblies."

BACKGROUND OF THE INVENTION

1. Field of the Invention

The present invention relates generally to fastener assemblies and, more particularly, to fastener assemblies configured to secure one or more components together, such as panels within a vehicle that are secured together during the manufacturing process of the vehicle.

2. Description of the Background of the Invention

Fastener assemblies may be used in a variety of applications, including automobile manufacturing. For example, during a manufacturing process for a vehicle, various components may be secured together by a fastener or fastener assembly. Particular examples may include an interior frame panel that may be secured to an exterior door panel, or an air bag assembly that may be secured to an interior door panel or glove compartment panel. As another example, a wheel liner may be secured to a vehicle sheet metal or a fender wheel well. Typically, components are secured together using one or more fasteners or fastener assemblies, such as plastic rivet style fasteners.

Many known plastic rivet style fasteners are configured to fit into a hole of a particular size. In the instance that a hole is not of a particular size, the component is typically modified to accommodate the fastener or fastener assembly, causing an undue burden during the manufacturing process. Further, many prior art fastener assemblies lose retention strength over time when a load or force is applied to the fastener assemblies or when a load or force is applied to areas adjacent to, or even remote from, the fastener assemblies. Even further, the method or process of fastening components together using a fastener or fastener assembly may always be improved or simplified.

A need therefore exists for a rivet fastener assembly that does not require a hole of a component to be modified in order to be used. Further, a need exists for a rivet fastener assembly that is configured to be used with existing trim and panel holes, and which may be used to fasten together components having holes or apertures with variable shapes and sizes. Also, a need exists for a rivet fastener assembly that may be installed without specialized tools and, even further, a need exists for a rivet fastener assembly with the aforementioned characteristics that may be easily installed, or removed, during a manufacturing process.

SUMMARY OF THE INVENTION

In one aspect, a rivet fastener assembly is configured to securely clamp together one or more components. The rivet fastener assembly includes a pin and a rivet body having a collar and a column extending from the collar. The rivet body further includes a collar stop configured to provide a positive locating feature for the pin once assembled.

In related embodiments, a passage is defined through the collar and column, wherein the column includes a first set of legs configured to fold and directly contact the one or more components when folded and a second set of legs configured to fold and reinforce the first set of legs when folded. Further, the first set of legs and the second set of legs may comprise bulges that project radially outward, as well as inner recessed areas. Still further, the pin may comprise a plurality of annular projections and a beveled nose. The pin may also include a protrusion that is proximate a first distal end of the pin, and that is between the annular projections and the beveled nose. The protrusion may be configured to pre-flex at least one leg of the first set of legs or the second set of legs. It is also contemplated that that the rivet body may include a plurality of grooves configured to interlock with the annular projections and that those grooves are proximate to the collar stop. It is further envisioned that the pin may include a ledge configured to engage the collar stop.

In another aspect, a rivet fastener assembly is configured to securely clamp together one or more components. The rivet fastener assembly includes a pin and a rivet body having a collar and a column. The collar has an opening and the column extends from the collar and has an interior channel. The opening is contiguous with the interior channel, and a diameter of the opening is smaller than a diameter of the interior channel.

In some embodiments, the column may also include a first set of legs with radial gaps therebetween and a second set of legs with radial gaps therebetween. The first set of legs and the second set of legs may also include radially outward extending bulges and inner recessed areas. The pin may also include a longitudinal shaft, a ledge, and a plurality of circumferential rings extending from the ledge. Further, the longitudinal shaft may have a first diameter, and the ledge may have a second diameter that is different from the first diameter. The pin may further include a beveled nose with a lower edge having a third diameter, which may be a diameter different from the first diameter and the second diameter. The pin may also have a convex ring that circumscribes a first edge of the plurality of circumferential rings, and the convex ring may be proximate to the second set of legs.

In a further aspect, the present disclosure provides a rivet fastener assembly having a pin and a rivet body. The pin has a longitudinal shaft, a securing section, and a bulbous head. The rivet body has a collar with a first opening and a column. The column includes component-engaging legs, reinforcing legs, an internal passage that extends between the first opening and a second opening, and a locking section proximate to the first opening of the collar. Further, the first opening has a diameter smaller than a diameter of the securing section.

In related embodiments, a diameter of the bulbous head may be larger than a diameter of the second opening. The rivet body may further include an annular wall, which may define the first opening.

The foregoing and other aspects and advantages of the disclosure will appear from the following description. In the description, reference is made to the accompanying drawings, which form a part hereof, and in which there is shown by way of illustration a preferred configuration of the disclosure. Such configuration does not necessarily represent the full scope of the disclosure, however, and reference is made therefore to the claims herein for interpreting the scope of the disclosure.

BRIEF DESCRIPTION OF THE DRAWINGS

The invention will be better understood and features, aspects, and advantages other than those set forth above will become apparent when consideration is given to the following detailed description thereof. Such detailed description makes reference to the following drawings.

Figure 1A:
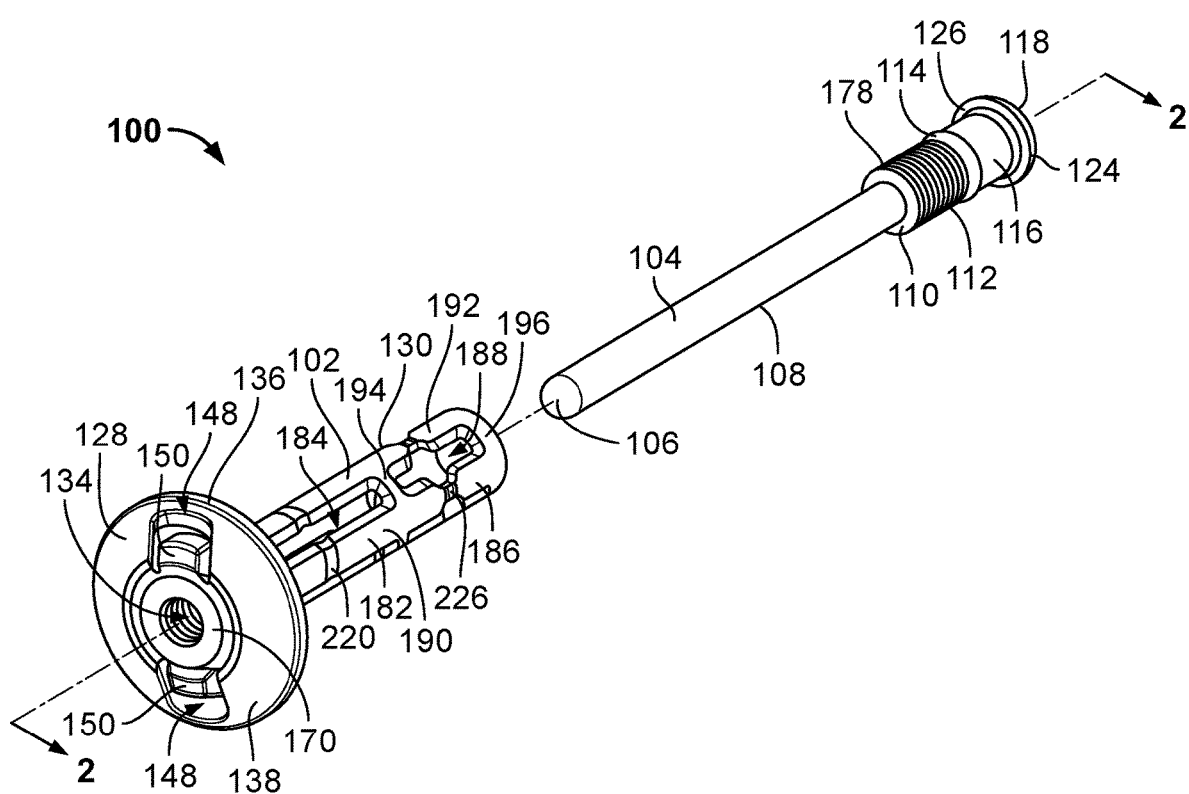
FIG. 1A is a front, top, and right side isometric view of a fastener assembly that includes a pin and a rivet body, wherein the fastener assembly is shown in an unassembled configuration.
Figure 1B:
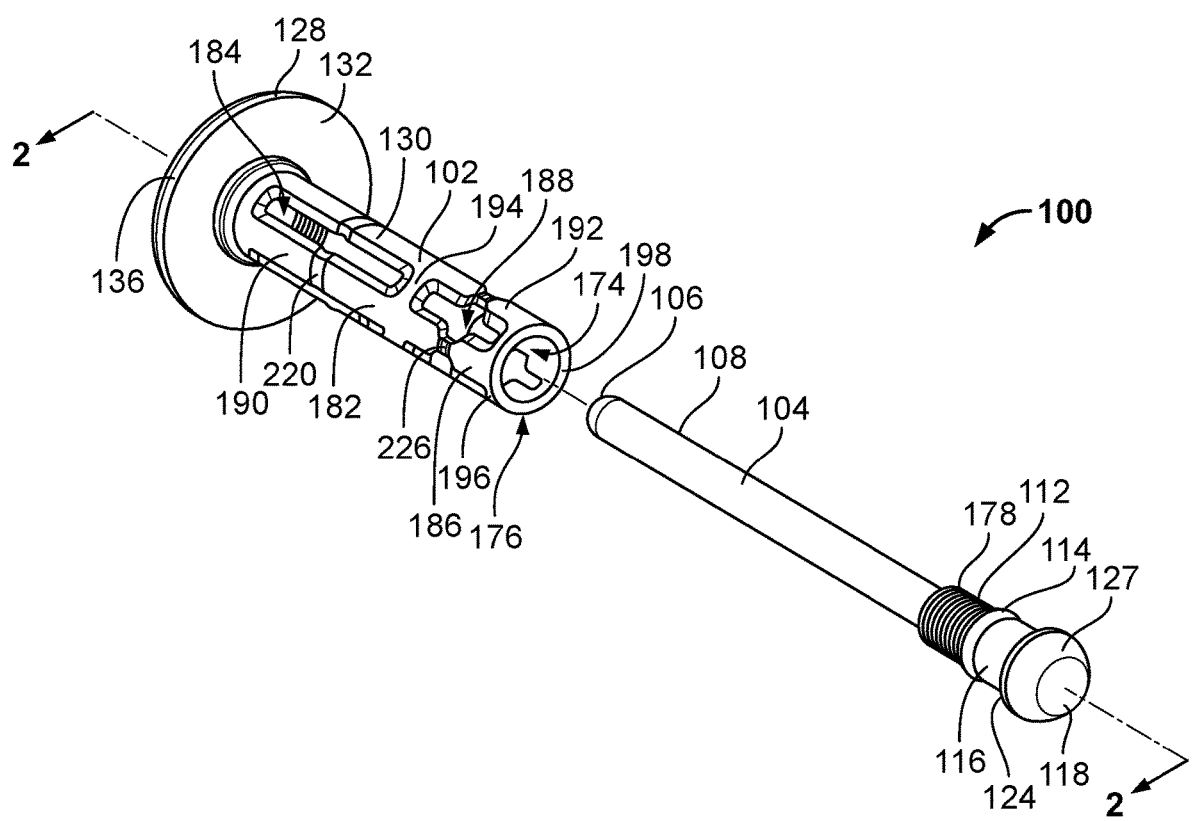
FIG. 1B is a rear, top, and right side isometric view of the fastener assembly of FIG. 1A.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

Certain embodiments of the present disclosure provide a rivet fastener assembly that does not require a hole of a component to be modified in order to be used. Instead, the rivet fastener assembly is configured to be used with existing trim and panel holes, and may be used with components having a wider range of hole shapes and sizes. Further, the rivet fastener assembly may be installed without specialized tools, and the rivet fastener assembly may be configured to be easily serviced and removed.

FIGS. 1A, 1B, 2A and 2B illustrate a fastener assembly 100, and components thereof, in an unassembled state and according to the present disclosure. In the illustrated embodiment, the fastener assembly 100 includes a rivet body or grommet 102, and a pin or rod 104, which may be inserted within and through the rivet body 102. For example, FIGS. 3-6 depict the fastener assembly 100 in a first, assembled configuration and, more particularly, an embodiment of the fastener assembly 100 that includes the pin 104 positioned within and extending through the rivet body 102. The rivet body 102 and the pin 104 may each be individually formed from a plastic material, such as polyamide (PA), polybutylene terephthalate (PBT), polyoxymethylene (POM). In other embodiments, the rivet body 102 and the pin 104 may be formed from polyethylene terephthalate (PET), high-density polyethylene (HDPE), polyvinyl chloride (PVC), low-density polyethylene (LDPE), and/or polypropylene (PP), for example.

Figure 2A:
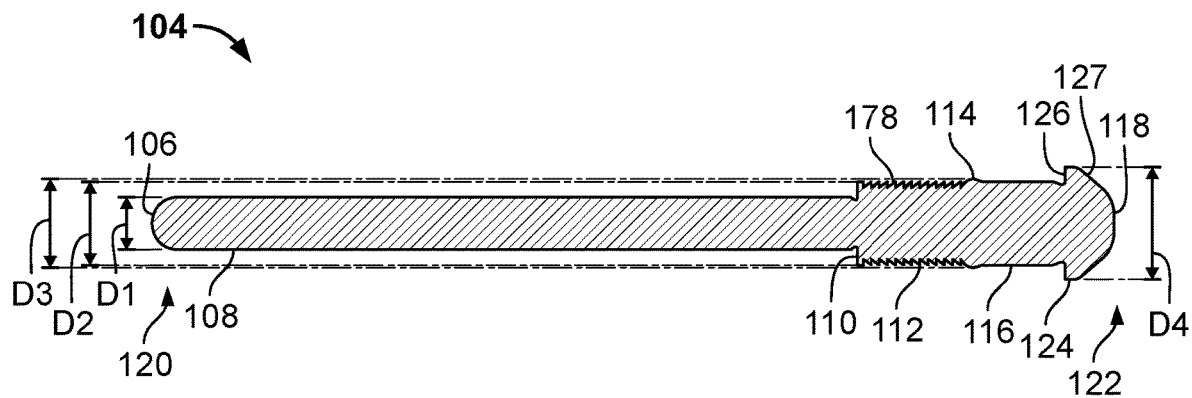
FIG. 2A is a cross-sectional view of the pin of FIGS. 1A and 1B, taken along lines 2-2 thereof.

With particular reference to FIG. 2A, the pin 104 may comprise a rounded head 106, a longitudinal shaft 108, a ledge 110 adjacent a securing section 112, a bulbous rim 114, an intermediate shaft 116, and a beveled nose 118. In this embodiment, the rounded head 106 is a hemispherical protuberance proximate a front distal end 120 of the longitudinal shaft 108. However, in other embodiments, the front distal end 120 of the pin 104 may be a planar, distal surface.

The beveled nose 118 extends from a rear distal end 122 of the pin 104, which is opposite from the front distal end 120. The beveled nose 118 may also include a circumferential lip 124 that extends from a lower edge or rim 126, and a rounded head 127 that extends, and angles inward, from the circumferential lip 124. Further, the lower edge 126 of the beveled nose 118 is generally flat and perpendicular to the axis 2-2 (see FIGS. 1A and 1B).

In particular embodiments, such as that shown in FIGS. 1A, 1B, 2A, and 2B, the circumferential lip 124 has a diameter that is greater than a diameter of the longitudinal shaft 108, the securing section 112, and/or the rounded head 106 of the pin 104. In further embodiments, the diameter of the circumferential lip 124 is greater than a diameter of any other portion of the pin 104.

Still referencing FIG. 2A, the longitudinal shaft 108 may have a diameter D1, the ledge 110 may have a diameter D2, the bulbous rim 114 may have a diameter D3, and the circumferential lip 124 may have a diameter D4. In this particular embodiment, the diameter D4 is greater than the diameter D1, the diameter D2, and the diameter D3. Further, in this embodiment, the diameter D3 is greater than the diameter D1 and the diameter D2, and the diameter D2 is greater than the diameter D1.

Figure 2B:
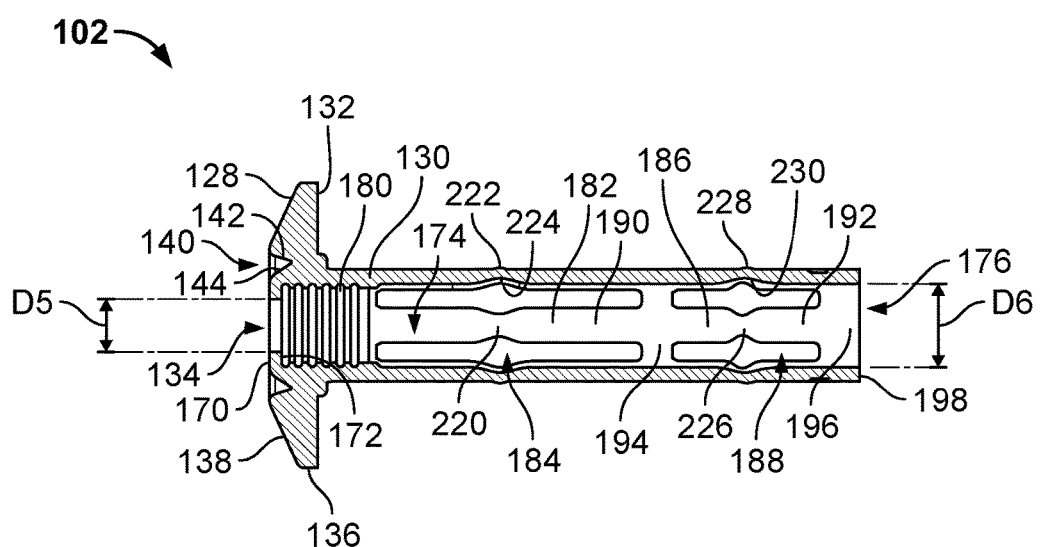
FIG. 2B is a cross-sectional view of the rivet body of FIGS. 1A and 1B, taken along lines 2-2 thereof.

Turning to FIG. 2B, the rivet body 102 may include an annular collar 128 and a receiving column 130. In preferred embodiments, the receiving column 130 may extend from a rear surface 132 of the collar 128 and may be coaxially aligned with the annular collar 128. Further, in the present embodiment, the collar 128 includes a generally annular configuration, i.e., a circular outer geometry with an opening 134 therethrough. However, other outer geometries are contemplated, e.g., a square, rectangle, oval, or any other shape. The rear surface 132 of the collar 128 is generally flat and perpendicular to the axis 2-2 (see FIGS. 1A and 1B), and a sidewall 136 extends between the rear surface 132 and a beveled surface 138 that is generally linear. In other embodiments, the beveled surface 138 may take other linear forms, be curvilinear, or a combination of both.

Still referencing FIG. 2B, a groove 140 may be proximate to the opening 134 and may be defined by one or more walls. For example, in the present embodiment, the groove 140 may be defined by an exterior wall 142 and an interior wall 144, which together form a crevasse therebetween. In other embodiments, the groove 140 may take numerous other forms as may be contemplated by those skilled in the art. Non-limiting examples may include a groove having an exterior wall, an interior wall, and a concave surface extending between the exterior wall and the interior wall, or a groove having a parabolic cross-section.

Figure 3:
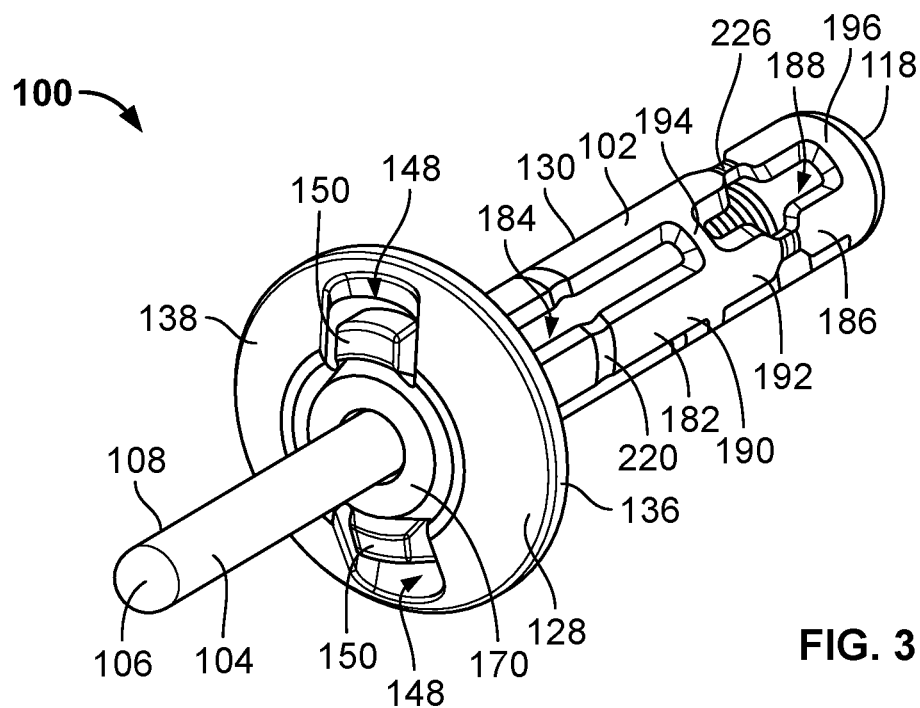
FIG. 3 is a front, top, and right side isometric view of the fastener assembly of FIG. 1 shown in a first, assembled configuration.
Figure 4:
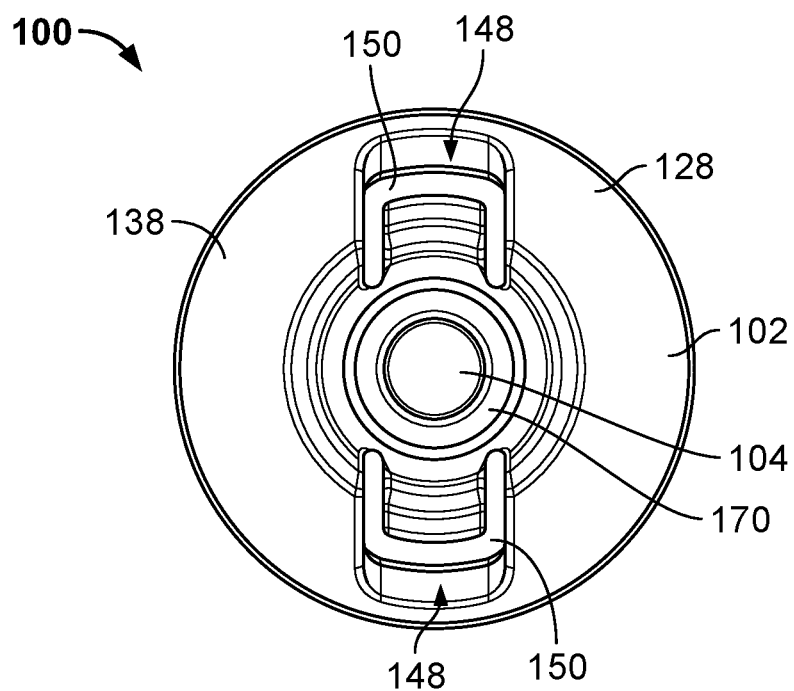
FIG. 4 is a front elevational view of the fastener assembly of FIG. 3.
Figure 5:
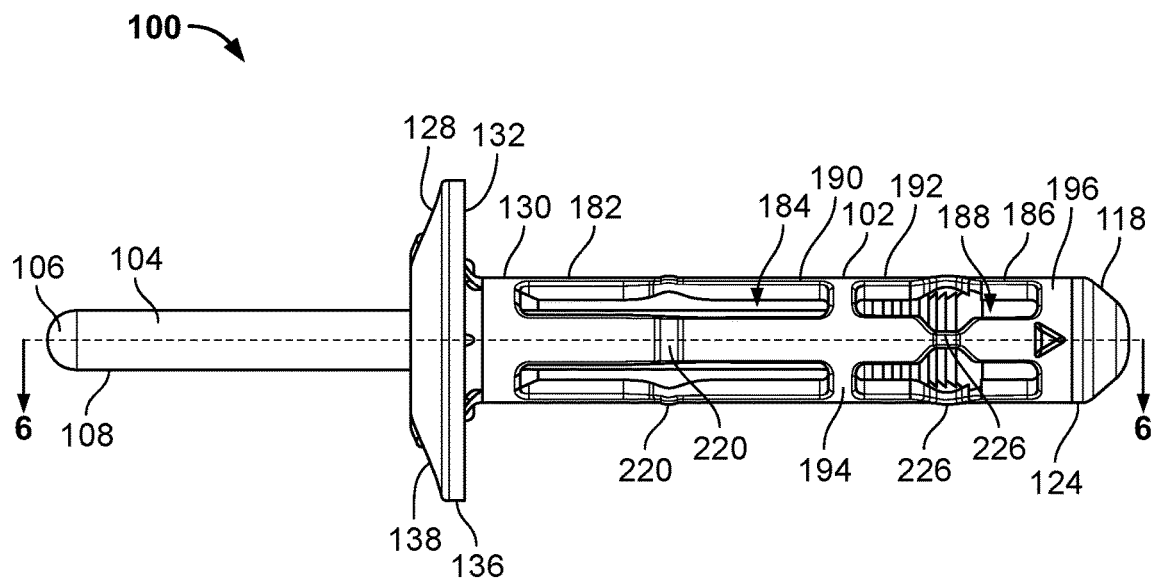
FIG. 5 is a right side elevational view of the fastener assembly of FIG. 3.

The rivet body 102 and, more particularly, the collar 128 thereof, may also include one or more features that allow a user to quickly and easily service, e.g., remove, the fastener assembly 100 from one or more components. For example, as best shown in FIGS. 3 and 4, the rivet body 102 may include one or more slots 148 and one or more tabs 150 positioned within the slots 148, wherein the slots 148 may define the tabs 150 therebetween.

In general, the slots 148 may be configured to receive operative portions of a tool, e.g., a needle nose pliers, so that the tabs 150 may be removed from the fastener assembly 100, if desired. And, as will be further discussed herein, removal of the tabs 150 may relieve a retention pressure from the pin 104, which may cause the pin 104 to freely move within, through, and from the rivet body 102. As such, the fastener assembly 100 may be disassembled and removed from one or more components. In this embodiment, the tabs 150 are two U or C-shaped components positioned opposite one another on a first and second side of the collar 128, and the slots 148 are vacant U or C-shaped areas that surround the tabs 150. Optionally, the slots 148 and the tabs 150 may be sized and shaped different from what is shown. In other embodiments, the rivet body 102 may have one or more slots 148 and one or more tabs 150 similar to those disclosed in PCT/US2017/041636, which claims priority to U.S. Provisional Application No. 62/374,129, both of which are hereby incorporated by reference in their entireties.

Turning to FIGS. 1-4 and 6, the rivet body 102 may also include an annular wall 170 that extends radially inward a predetermined distance from the interior wall 144 of the collar 128 (see FIG. 2B). The annular wall 170 may also generally define the opening 134. In these embodiments, the annular wall 170 may also include an interior surface or stop 172 (see FIGS. 2B and 6). In preferred embodiments, the opening 134 is centered within the annular wall 170 and is concentric with the axis 2-2 (see FIGS. 1A and 1B). Further, the receiving column 130 may also include an interior channel 174 that is contiguous, or in communication with, the opening 134 (see FIG. 2B). More particularly, the interior channel 174 may extend between the opening 134 and a second opening 176, and may be concentrically arranged about the axis 2-2 (see FIGS. 1A and 1B). In a preferred embodiment, the opening 134, the interior channel 174, and the second opening 176 are all concentrically arranged, and extend about, the axis 2-2.

As will be further discussed herein, the annular wall 170 may function as an inner collar stop and may be configured to provide a positive locating feature for the pin 104. More particularly, when a force is applied to the pin 104, such as a pulling force F shown in FIG. 6, the pin 104 may retreat or be urged in a forward direction until the ledge 110 of the pin 104 contacts the interior surface 172 of the collar stop or annular wall 170. For instance, the opening 134 may have a diameter less than a diameter of the interior channel 174 and, thereby, stop forward movement of the pin 104 when desired.

In particular embodiments, such as that shown in FIGS. 1A, 1B, 2A, and 2B, the interior channel 174 has a diameter defined by the second opening 176 and a diameter that is greater than a diameter of the first opening 134. With particular reference to FIG. 2B, the first opening 134 may have a diameter D5 and the second opening 176 (and/or the interior channel 174) may have a diameter D6. Further, in this embodiment, the diameter D6 may be greater than the diameter D5.

In some embodiments, a diameter D6 of the interior channel 174 is between 1 and 5 times larger than a diameter D5 of the opening 134, or between 1 and 2 times larger than a diameter D5 of the opening 134, or between 1 and 1.5 times larger than a diameter D5 of the opening 134, or between 1.2 and 1.4 times larger than a diameter D5 of the opening 134.

Further, as discussed herein with reference to FIG. 2A, the longitudinal shaft 108 may have a diameter D1, the ledge 110 may have a diameter D2, the bulbous rim 114 may have a diameter D3, and the circumferential lip 124 may have a diameter D4. In particular embodiments, a diameter D5 of the first opening 134 may be greater than a diameter D1 of the longitudinal shaft 108; a diameter D6 of the second opening 176 (and/or the interior channel 174) may be greater than a diameter D2 of the ledge 110 and/or a diameter D3 of the bulbous rim 114; a diameter D4 of the circumferential lip 124 may be greater than a diameter D6 of the second opening; and a diameter D2 of the ledge 110, and/or a diameter D3 of the bulbous rim 114, may be greater than a diameter D5 of the first opening 134.

Turning back to FIG. 2B, in this particular embodiment, the interior surface 172 is a planar or flat surface. However, in some embodiments, the interior surface 172 may also include an alternative stop feature on the interior surface 172, such as a ramped feature, a ledge, a clasp, a ridge, or the like that engages or contacts the ledge 110. As will become more apparent upon further discussion herein, the interaction between the ledge 110 of the pin 104 and the interior wall 172 of the collar 128 may control the position of the pin 104 relative to the rivet body 102 and, in particular, may define a stop position for the pin 104. More particularly, the collar stop or annular wall 170 provides an interference that stops or inhibits further forward translational movement of the pin 104 through the rivet body 102, even if a force (e.g., further pulling force in the direction of the pulling force F shown in FIG. 6) is applied to the pin 104.

As noted herein, the pin 104 may also include the securing section 112, as well as the bulbous rim 114. In particular embodiments, the securing section 112 may include one or more retention features configured to securely couple to reciprocal mating features within the rivet body 102. For example, in the present embodiment shown in FIGS. 1-7, the securing section 112 of the pin 104 is a plurality of annular or circumferential rings, projections, threads, studs, barbs, or ridges 178 that may engage, threadably engage, lock, or enter into an interference engagement with internal threads or grooves 180 within the receiving column 130, as will be further discussed herein (e.g., see FIGS. 10 and 12). The internal grooves 180 may be proximate a front end of the receiving column 130 and may be adjacent to (or immediately adjacent to) the annular wall 170 or opening 134. Further, in this embodiment, the threads or annular projections 178 angle rearwardly or toward the rear distal end 122 of the pin 104. In further embodiments, the securing section 112 of the pin 104 may be configured to engage an interior portion of the receiving column 130 using other connections, such as an interference or press fit, a tongue or groove connection, a rib and slot connection, or any other configuration contemplated by one of ordinary skill in the art.

With particular reference to FIGS. 1-3, 5, and 6, the receiving column 130 may also include a plurality of legs, such as a first set of legs 182 with radial gaps 184 therebetween and a second set of legs 186 with radial gaps 188 therebetween. As will be discussed in further detail herein, the first set of legs 182 may be component-engaging legs that overlay the second set of legs 186, which may be reinforcing legs that support the first set of legs 182. In particular, the first set of legs 182 may interact with or contact one or more components (once assembled) and the second set of legs 184 may be configured to fold, abut against, or reinforce the first set of legs 182 (once folded), thereby creating a strong and robust fastening assembly and connection. For example, as will also be further discussed herein, the fastener assembly 100 may be configured to attach to and clamp together multiple panels.

In one embodiment, the first set of legs 182 may include one or more flexible, linear beams 190 (in an unassembled state) that are separated by the radial gaps 184 and the second set of legs 186 may include one or more flexible, linear beams 192 (in an unassembled state) that are separated by the radial gaps 188. In a particular embodiment, the first set of legs 182 may include two flexible, linear beams (in an unassembled state) that are separated by radial gaps and the second set of legs 186 may include two flexible, linear beams (in an unassembled state) that are separated by radial gaps. Further, in the embodiment shown in FIGS. 1-6, the first set of legs 182 includes four flexible, linear beams 190 (in an unassembled state) that are separated by four radial gaps 184, and the second set of legs 186 includes four flexible, linear beams 192 (in an unassembled state) that are separated by four radial gaps 188. In other embodiments, the first set of legs 182 and the second set of legs 186 may have any number of flexible beams that may be contemplated by those skilled in the art.

Further, in this particular embodiment, the first set of legs 182 are longer than the second set of legs 186. Put differently, in the preferred embodiment shown in FIGS. 1-6, the second set of legs 186 are shorter than the first set of legs 182, which thereby provide a stiffer, more robust reinforcing support when folded that is less susceptible to bending, as compared to longer legs. Therefore, when folded, the second set of legs 186 may provide a stiff and robust support for the first set of legs 182. In a preferred embodiment, the first set of legs 182 are at least 1.25 times longer than the second set of legs 186, or at least 1.5 times longer than the second set of legs 186, or at least 2 times longer than the second set of legs 186. In other embodiments, the first set of legs 182 may be approximately the same length as the second set of legs 186, or the second set of legs 186 may be longer than the first set of legs 182. In even further embodiments, the first set of legs 182 may have legs (or flexible linear beams 190) of varying length and the second set of legs 186 may have legs (or flexible linear beams 192) of varying length. For instance, in such embodiments, the first set of legs 182 may have legs of a predetermined length and the second set of legs 184 may be longer or shorter than the predetermined length.

Further still, referencing FIGS. 1-6, positioned between the first set of legs 182 and the second set of legs 186 is an intermediate annular rim 194, and below the second set of legs 186 is a lower annular rim 196 proximate a lower exterior edge 198 that may define the second opening 176.

It should be understood that the terms first and second, as used herein, are interchangeable. For example, the first set of legs 182 may be considered a second set of legs, while the second set of legs 186 may be considered a first set of legs.

Turning back to FIGS. 1-3, 5, and 6, the first set of legs 182 may each, individually, include a flexible bridge or intermediate section 220 having one or more bulges 222 (see FIG. 2B), and/or one or more cut-out sections or notches 224 (see FIG. 2B) that are coextensive with the radial gaps 184. The second set of legs 186 may also include a flexible bridge or intermediate section 226 with one or more bulges 228 (see FIG. 2B), and/or one or more notches 230 (see FIG. 2B) that are coextensive with the radial gaps 188. In particular embodiments, the flexible intermediate sections 220, 226 are arched, outwardly bowing, convex, or curved wall segments that extend outwardly from the internal passage or channel 174 of the rivet body 102. The intermediate sections 220, 226 may extend across an entire external circumference of the rivet body 102 on the first set of legs 182 and the second set of legs 186, individually. Alternatively, the intermediate sections 220, 226 may only extend partially across the first set of legs 182 and/or the second set of legs 186, respectively.

Figure 6:
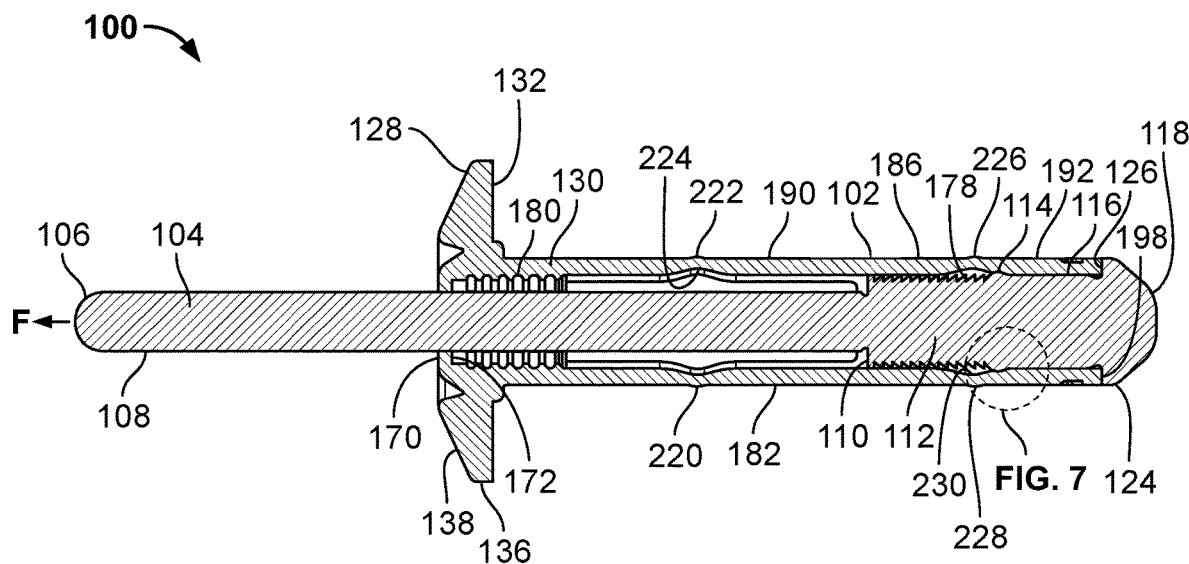
FIG. 6 is a cross-sectional view taken along lines 6-6 of FIG. 5.
Figure 7:
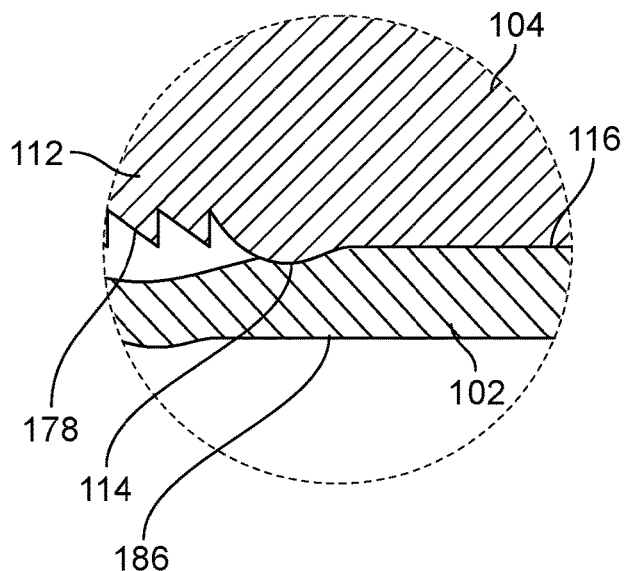
FIG. 7 is an enlarged view of a section of FIG. 6.

The flexible intermediate sections 220, 226 of the first set of legs 182 and the second set of legs 186 allow the legs or flexible beams 190, 192 to flex outwardly during operational use, as will be further discussed herein. More particularly, when a force (e.g., a pulling force F, as shown in FIG. 6) is applied to the pin 104, the flexible intermediate sections 220 bias the first set of legs 182 and the flexible intermediate sections 226 bias the second set of legs 186 to allow the force to be directed outwardly and away from an axis of the assembly and may cause the legs to fold in an intended direction. The intermediate sections 220, 226 also reduce a force required to collapse the legs of the rivet body 102. As such, the pin 104 may fully travel through the rivet body 102 so that the ledge 110 may contact the interior surface 172, and thereby control a break point and an assembly of the fastener assembly, without undesired friction or resistance.

As best shown in FIGS. 1A, 1B, 2A, 6, and 7, the pin 104 includes a bulbous rim 114, which in this embodiment is a radial or circumferential protrusion (e.g., an arcuate bulge) with a convex exterior surface. The bulbous rim 114 may be proximate the securing section 112, and/or between the securing section 112 and the beveled nose 118 (or the rear distal end 122). Further, in the particular embodiment shown in FIG. 7, the bulbous rim 114 is proximate a rear side of the second set of legs 186 and, as a result, applies an outward force that biases the second set of legs 186 slightly outward in the first assembled state. As such, once the fastener assembly 100 is an assembled state, the bulbous rim 114 may cause the first set of legs 182 and/or the second set of legs 186 to be pre-flexed, as the bulbous rim 114 exerts or applies an outwardly directed force to the second set of legs 186. Further, due to the particular location of the bulbous rim 114, less force is required to flex the second set of legs 186. In other embodiments, the pin 104 may include a bulbous rim 114 between the ledge 110 and the rounded head 106 of the pin 104, or adjacent a front or rear side of the first set of legs 182, to thereby apply an outward force to the first set of legs 182 in a first assembled state. Alternatively, the bulbous rim 114 may be at a location on the pin 104 so that, once the pin 104 is inserted through the rivet body 102, the bulbous rim 114 is proximate the intermediate annular rim 194. In further embodiments, the pin 104 may include one or more bulbous regions or rims 114. In essence, the bulbous rim 114 may be positioned at any of one or more locations along the pin 104 that may be contemplated or desired to pre-flex one or more components or areas along the column 130.

During assembly of the fastener assembly 100, the rounded head 106 of the pin 104 may be axially aligned with the second opening 176 (see FIGS. 1A and 1B), and urged into and through the second opening 176. The pin 104 may then be further inserted into and urged through the receiving column 130 of the rivet body 102 so that the rounded head 106 of the pin 104 passes through the opening 134 of the collar 128. The pin 104 may continue to move through the rivet body 102 until the lower edge 126 of the beveled nose 118 of the pin comes into contact with, is disposed adjacent to, or is flush with the lower exterior edge 198 of the rivet body 102 (see FIG. 6). Once the lower edge 126 of the beveled nose 118 contacts the lower exterior edge 198 of the rivet body 102, further movement of the pin 104 through the rivet body 102 is halted and the fastener assembly 100 is in a first, assembled state, as shown in FIGS. 3-6.

With particular reference to FIGS. 3-6 and 8-12, the fastener assembly 100 may then transition between a first assembled state (see FIGS. 3-6), a second assembled state (see FIG. 8), a third assembled state (see FIGS. 9 and 10), and a fourth assembled state (see FIGS. 11 and 12), as will be discussed below. More particularly, once the fastener assembly 100 is in the first assembled state, as shown in FIGS. 3-6, a pulling force F (see FIG. 6), may be applied to the longitudinal shaft 108 of the pin 104. And, because the circumferential lip 124 of the pin 104 has a diameter D4 that is greater than a diameter D6 of the second opening 176, pulling the pin 104 in this manner may cause the first set of legs 182, or the second set of legs 186, to fold, outwardly flatten, or collapse. Put differently, by pulling the pin 104 in this manner, the beveled nose 118 forces the receiving column 130 upward, thereby causing the first set of legs 182 and/or the second set of legs 186 to collapse.

In particular embodiments, the flexible bridge or intermediate sections 220 of the first set of legs 182 are more flexible (or less stiff) than the flexible bridge or intermediate sections 226 of the second set of legs 186 and, therefore, the first set of legs 182 collapse or flatten first, or before the second set of legs 186 collapse or flatten. Alternatively, in other embodiments, the flexible bridge or intermediate sections 226 of the second set of legs 186 are more flexible (or less stiff) than the flexible bridge or intermediate sections 220 of the first set of legs 182 and, therefore, the second set of legs 186 collapse or flatten first, or before the first set of legs 182 collapse or flatten. In even further embodiments, the flexible bridge or intermediate sections 220 of the first set of legs 182 have the same flexibility or stiffness as the flexible bridge or intermediate sections 226 of the second set of legs 186 and, therefore, the first set of legs 182 and the second set of legs 186 collapse simultaneously.

Figure 8:
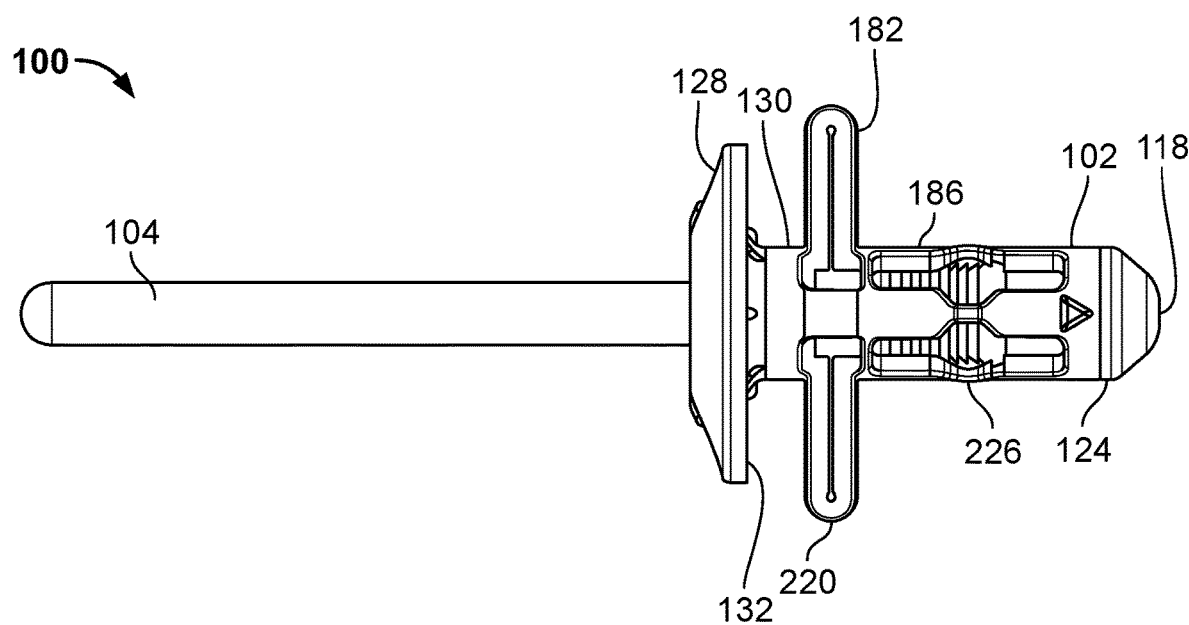
FIG. 8 depicts the fastener assembly of FIG. 3 in a second, assembled configuration.

However, in the particular embodiment shown in FIGS. 3-12, the pin 104 may be continuously pulled using a force F until the first set of legs 182 fold or flatten, as shown in FIG. 8, at which point the fastener assembly 100 is in the second, assembled state. In other words, the fastener assembly 100 may be in the second, assembled state once one of the first set of legs 182 or the second set of legs 186 are flattened or extend outwardly.

Figure 9:
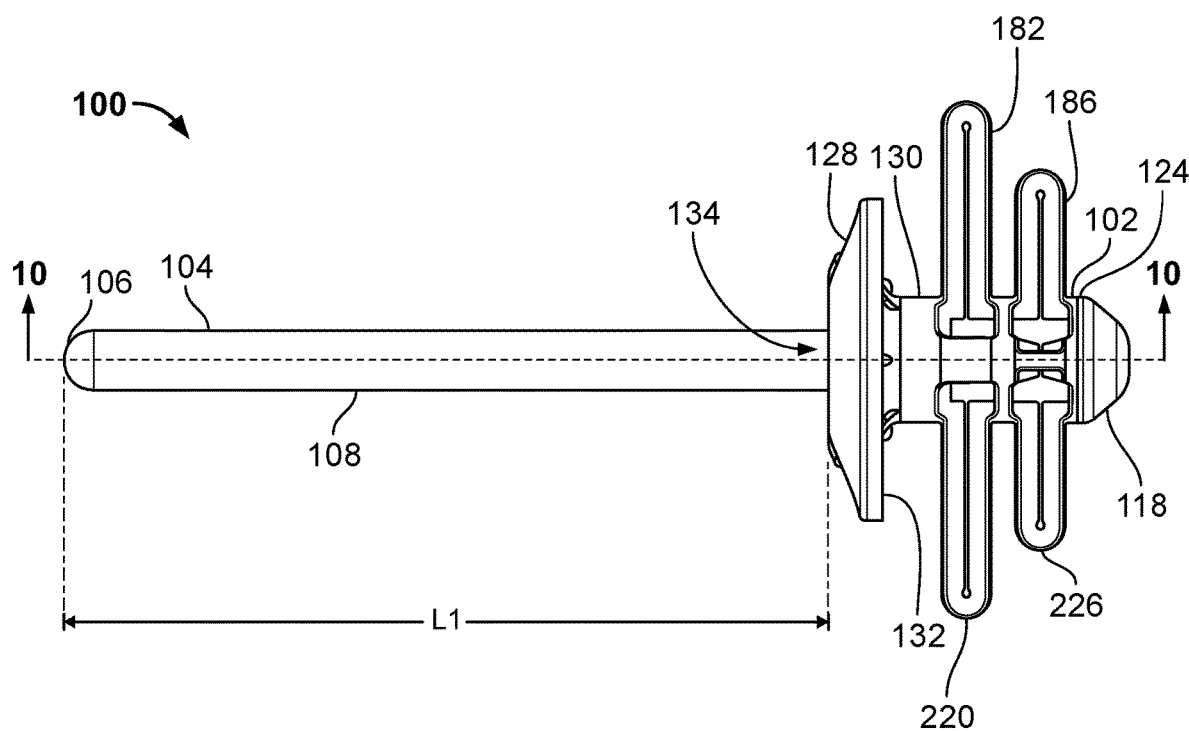
FIG. 9 depicts the fastener assembly of FIG. 3 in a third, assembled configuration.
Figure 10:
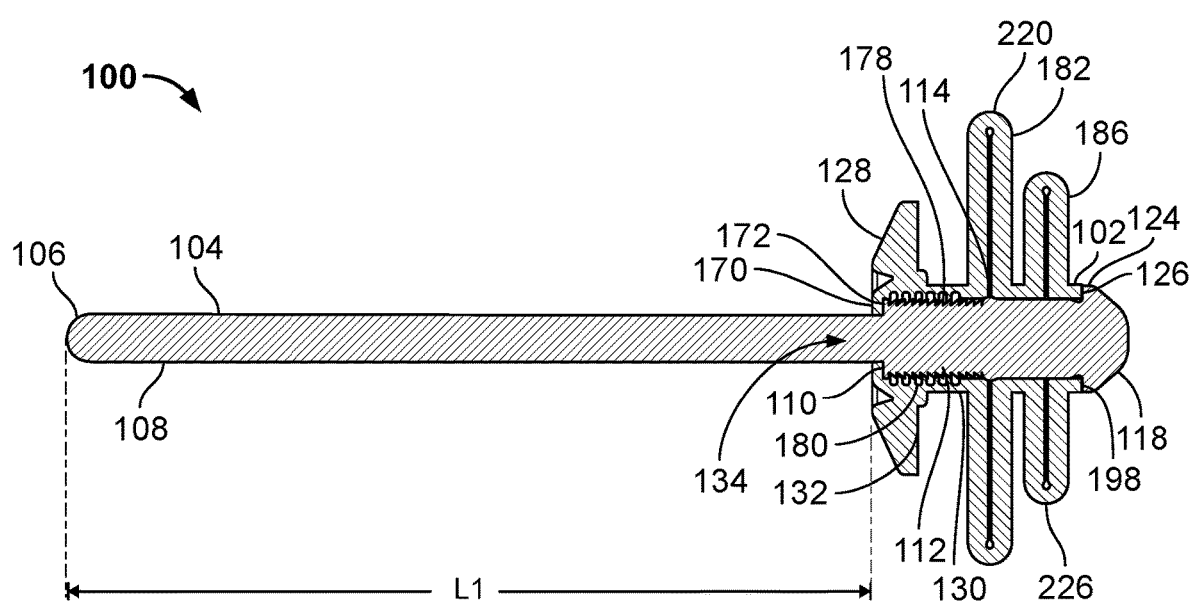
FIG. 10 is a cross-sectional view taken along lines 10-10 of FIG. 9.

With particular reference to FIGS. 9 and 10, a user may continue to pull the pin 104 of the fastener assembly 100 until the ledge 110 of the pin 104 contacts the interior surface 172 of the annular wall 170 (see FIG. 10). As such, in these embodiments, a location of the ledge 110 on the pin 104 may control the extent or length the pin 104 may be pulled through the rivet body 102 and, as a result, the extent to which the first set of legs 182 and the second set of legs 186 may collapse or fold. More particularly, the stop or interior surface 172 functions as an inner collar stop and may be configured to provide a positive locating feature for the pin 104. As such, the interior surface 172 may prevent overextension of the pin 104 through the rivet body 102, and may prevent the first set of legs 182 and/or the second set of legs 186 from folding or bending beyond a desired position.

In some embodiments, the pin 104 may be constructed so that the ledge 110 thereof is proximate a desired location along the pin 104 that prevents the first set of legs 182 and/or the second set of legs 186 from folding or bending beyond a desired position. For example, as one skilled in the art would appreciate, the closer the ledge 110 is to the rounded head 106, or the front distal end 120, of the pin 104, the sooner the ledge 110 will contact the interior surface 172 and the sooner the first set of legs 182 and the second set of legs 186 will stop folding. Alternatively, if the ledge 110 is closer to the beveled nose 118, or the rear distal end 122, of the pin 104, the pin 104 may continue to be pulled for a longer period of time and, as a result, the first set of legs 182 and/or the second set of legs 186 may continue to fold for a longer period of time. In a preferred embodiment, the ledge 110 is proximate a location along the pin 104 so that the ledge 110 contacts the stop or interior surface 172 contemporaneously, simultaneously, or at the same time as when the first set of legs 182 and the second set of legs 186 completely flatten. In other words, in this preferred embodiment, when the ledge 110 contacts the interior surface 172, the first set of legs 182 and the second set of legs 186 are completely flattened.

However, in alternative embodiments, the ledge 110 is proximate a location along the pin 104 so that the first set of legs 182 and/or the second set of legs 186 only partially bend. For example, in the embodiment shown in FIG. 20, the second set of legs 186 are V-shaped or may be characterized as having a 20 to 50 degree bend. In further embodiments, the ledge 110 is proximate a location along the pin 104 so that when the ledge contacts the stop or interior surface 172, the first set of legs 182 and/or the second set of legs have a 10 to 170 degree bend, or a 10 to 90 degree bend, or a 10 to 40 degree bend.

As noted above, the fastener assembly 100 is in the third assembled state once the ledge 110 contacts the stop or interior surface 172 and/or when both the first set of legs 182 and the second set of legs 186 are completely flattened or folded. As a note, in the embodiment where the flexible bridge or intermediate sections 220 of the first set of legs 182 have the same flexibility as the flexible bridge or intermediate sections 226 of the second set of legs 186, the fastener assembly 100 would simply transition from the first assembled state to the third assembled state, as the first set of legs 182 and the second set of legs 186 collapse simultaneously and, as such, would never enter a second assembled state as described herein.

In the present embodiment, the notches 224 and the notches 230 also function to control or ease the collapse of the first set of legs 182 and the second set of legs 186. For example, the notches 224 may redirect a force applied to the intermediate sections 220 toward a rigid portion of the first set of legs 182, e.g., a portion of the first set of legs 182 that is not flexible.

As shown in FIGS. 9 and 10, a length L1 of the longitudinal shaft 108 of the pin 104 may extend from the opening 134 of the collar 128 in the third assembled state. This portion or length L1 of the pin 104, or longitudinal shaft 108 thereof, may be removed, such as via breaking or cutting. More particularly, the pin 104 may be broken with a sufficient force during assembly at a location near the annular wall 170 and the ledge 110. As such, once broken, the pin 104 does not extend outward from the opening 134.

Figure 11:
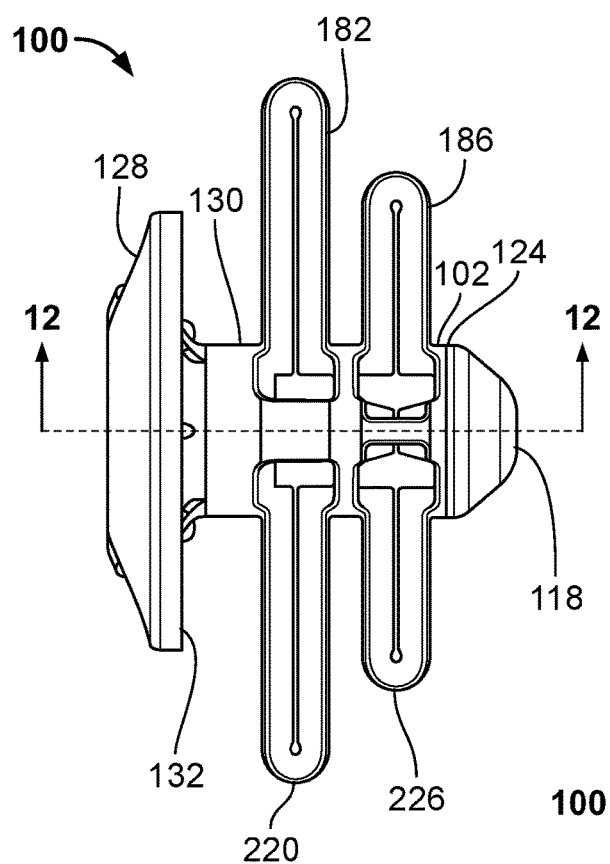
FIG. 11 depicts the fastener assembly of FIG. 3 in a fourth, assembled configuration.
Figure 12:
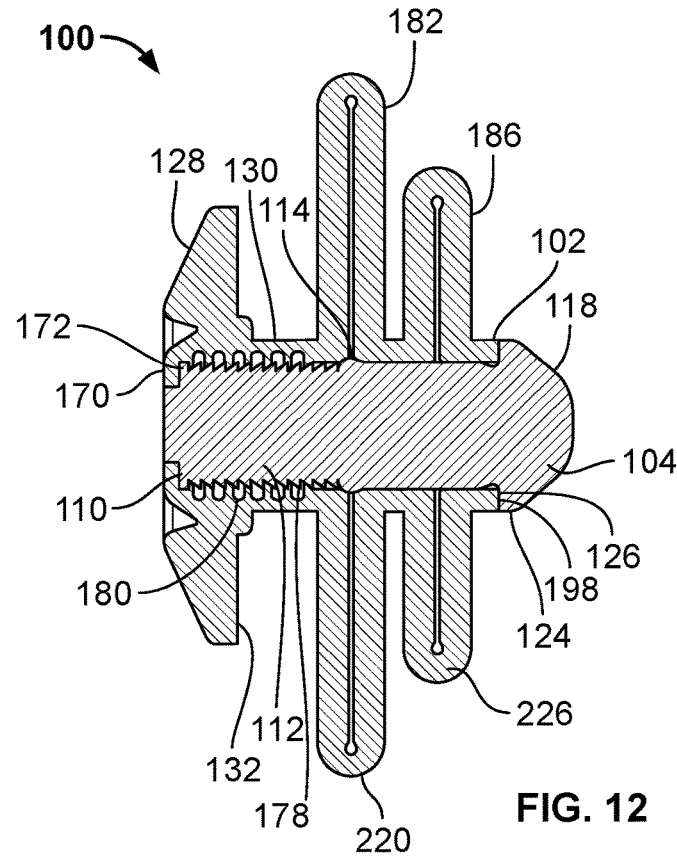
FIG. 12 is a cross-sectional view taken along lines 12-12 of FIG. 11.

Once removed, the fastener assembly 100 may then be in the fourth assembled state, as shown in FIGS. 11 and 12. As further shown in FIG. 12, the securing section 112 of the pin 104 may be in engagement with the internal threads or grooves 180 of the rivet body 102, which secures the pin 104 within the rivet body 102. In particular, the engagement between the securing section 112 of the pin 104 and the internal threads or grooves 180 of the rivet body 102 prevents axial or lateral movement of the pin 104 and the rivet body 102 relative to one another. As noted herein, in other embodiments, the securing section 112 of the pin 104 may be configured to engage an interior portion of the receiving column 130 using other connections, such as an interference or press fit, a tongue or groove connection, a rib and slot connection, or any other configuration contemplated by one of ordinary skill in the art.

Further, although the fastener assembly 100 of the present embodiment transitions between assembled states by application of a pulling force F, it is envisioned that the pin 104 may cooperate with the rivet body 102 in an alternative fashion to collapse or flatten the first set of legs 182 and the second set of legs 186. For example, it is envisioned that the fastener assembly 100 may transition between the assembled states by rotational movement of either the rivet body 102 or the pin 104, or by application of a pushing force. For example, the rivet body 102 and the pin 104 may include threaded sections or radial protrusions that travel along cooperative engagement features that allow for longitudinal translation of the lower annular rim 196 toward the collar 128, and, thereby, flattening of the first set of legs 182 and the second set of legs 186.

FIGS. 13-16 illustrate a method of using the fastener assembly 100 and, in particular, a process in which the fastener assembly 100 fastens or secures a first component 250, e.g., a first panel, together with a second component 252, e.g., a second panel.

Figure 13:
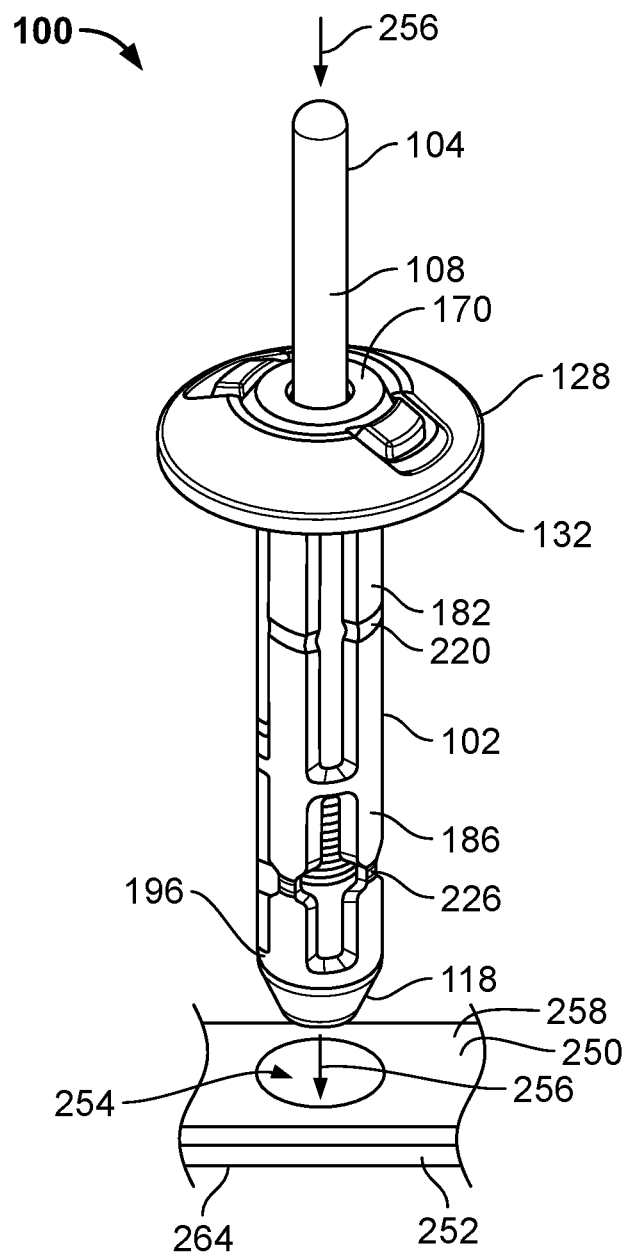
FIG. 13 depicts the fastener assembly of FIG. 3 aligned with an aperture of a first and second component.
Figure 14:
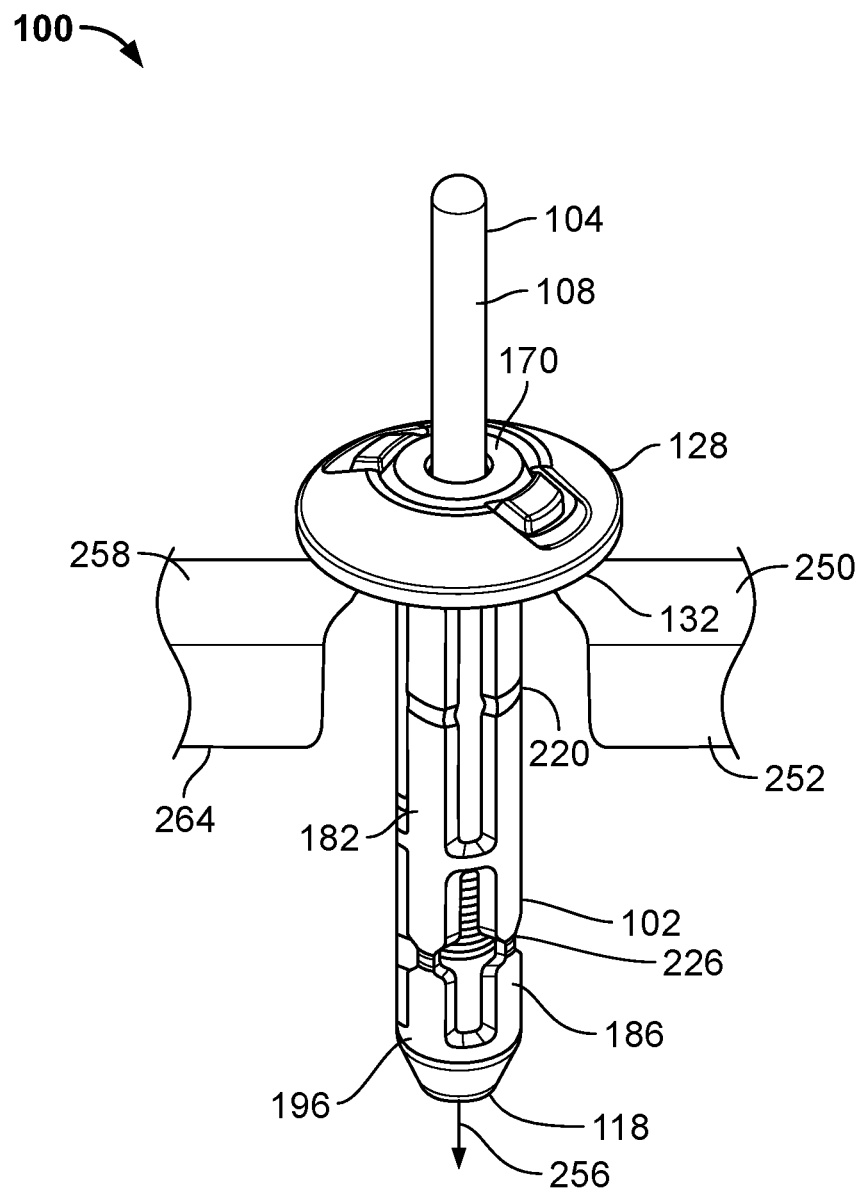
FIG. 14 depicts the fastener assembly of FIG. 13 initially mated with the first and second components, wherein portions of the first and second components have been removed for clarity.

First, as shown in FIGS. 13 and 14, a user may align the assembled fastener assembly 100 with one or more holes or apertures, e.g., a first hole 254 of the first component 250 and a second hole (not shown) of the second component 252 (see FIG. 13), and then insert the assembled fastener assembly 100 in a direction of arrow 256 through the holes or apertures (see FIG. 14). The fastener assembly 100 may be urged into and through the hole 254 until the rear surface 132 of the collar 128 abuts against an outer surface 258 of the first component 250, which surrounds the hole 254. More particularly, the fastener assembly 100 may be positioned through the holes of the first and second components 250, 252 so that the rim or rear surface 132 is proximate and in contact with an outer surface 258 of the first component 250.

As will be further discussed herein, a size or shape of the holes or apertures of the components 250, 252 may vary and the fastener assembly 100 may be used to fasten together components having holes of varying sizes. However, in particular embodiments, the collar 128 of the rivet body 100 must have a diameter greater than the hole 254 of the first component 250, and the first set of legs 182 must extend outward a distance or have a span 260 (see FIGS. 17 and 19) when folded that is larger than a diameter of a hole of a lower component to be secured, e.g., the second component 252 in the present embodiment.

Figure 15:
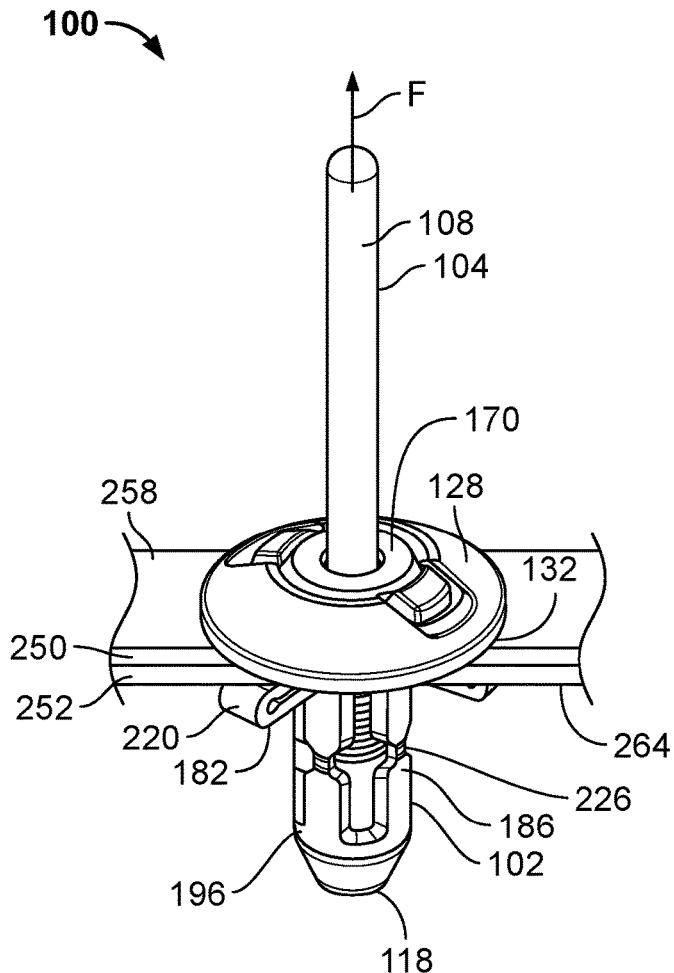
FIG. 15 depicts the fastener assembly of FIG. 14 after which the pin has been partially pulled upward, in relation to the rivet body.
Figure 16:
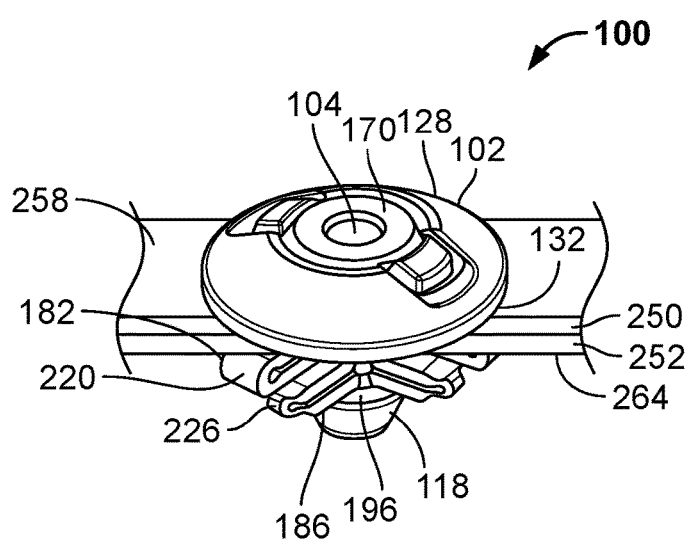
FIG. 16 depicts the fastener assembly of FIG. 15 after which the pin has been pulled fully upward, in relation to the rivet body, and segmented.

As shown in FIG. 15, after insertion of the fastener assembly 100 through the first and second holes of the first and second components 250, 252 a user may apply a pulling force F to the pin 104. Upon application of the pulling force F to the pin 104, the beveled nose 118 (and, as a result, the lower annular rim 196 of the rivet body 102) moves longitudinally toward the collar 128, as discussed herein. Continued movement of the lower annular rim 196 causes the flexible intermediate section 220 of the first set of legs 182 to flex outwardly, as shown in FIG. 15, and even further continued movement of the lower annular rim 196 may cause the flexible intermediate section 226 of the second set of legs 186 to flex outwardly, as shown in FIG. 16. As discussed herein, the second set of legs 186 may flex outwardly so that the second set of legs 186 are proximate to the first set of legs 182 and provide support therefor. As such, as also discussed herein, the second set of legs 186 may include a stiffer or more robust material than the first set of legs 182.

A user may apply a pulling force F to the pin 104 until a top side of the first set of legs 182 contacts a rear side 264 of the second component 252, and may continue to apply a pulling force F to the pin 104 until the ledge 110 of the pin 104 contacts the interior surface 172 of the collar stop 170. After the ledge 110 engages the interior surface 172, further movement of the pin 104 through the rivet body 102 is halted and the portion of the pin 104 extending above the collar 128 may be removed.

Figure 17:
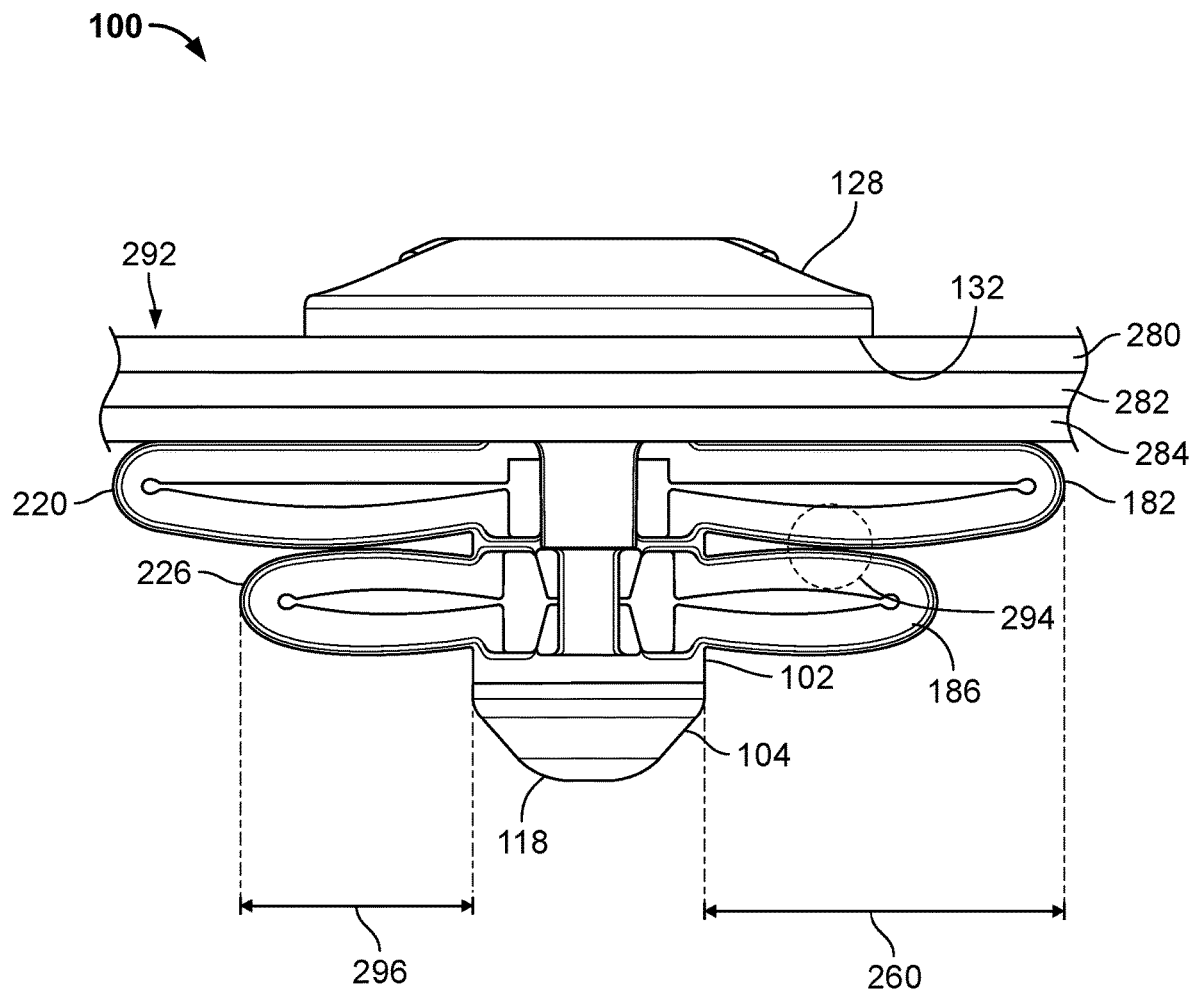
FIG. 17 depicts the fastener assembly of FIG. 3, wherein the fastener assembly is used to fasten together a first, second, and third component.
Figure 18:
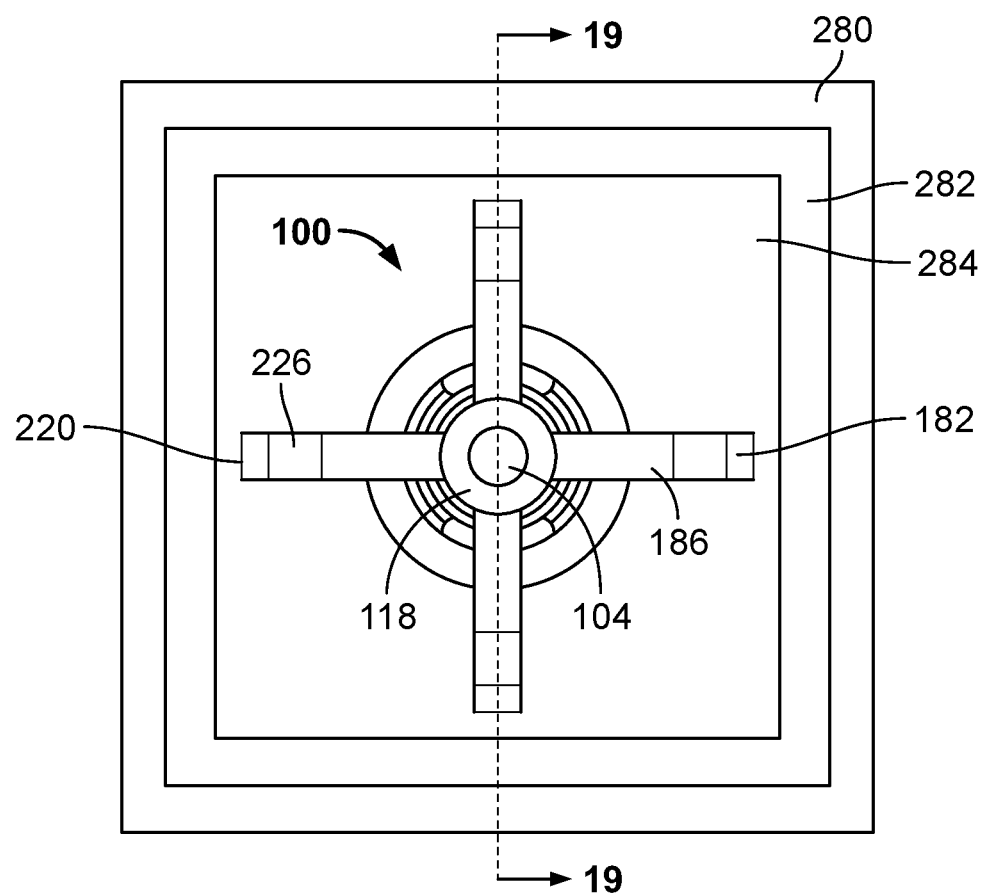
FIG. 18 is a bottom plan view of FIG. 17.
Figure 19:
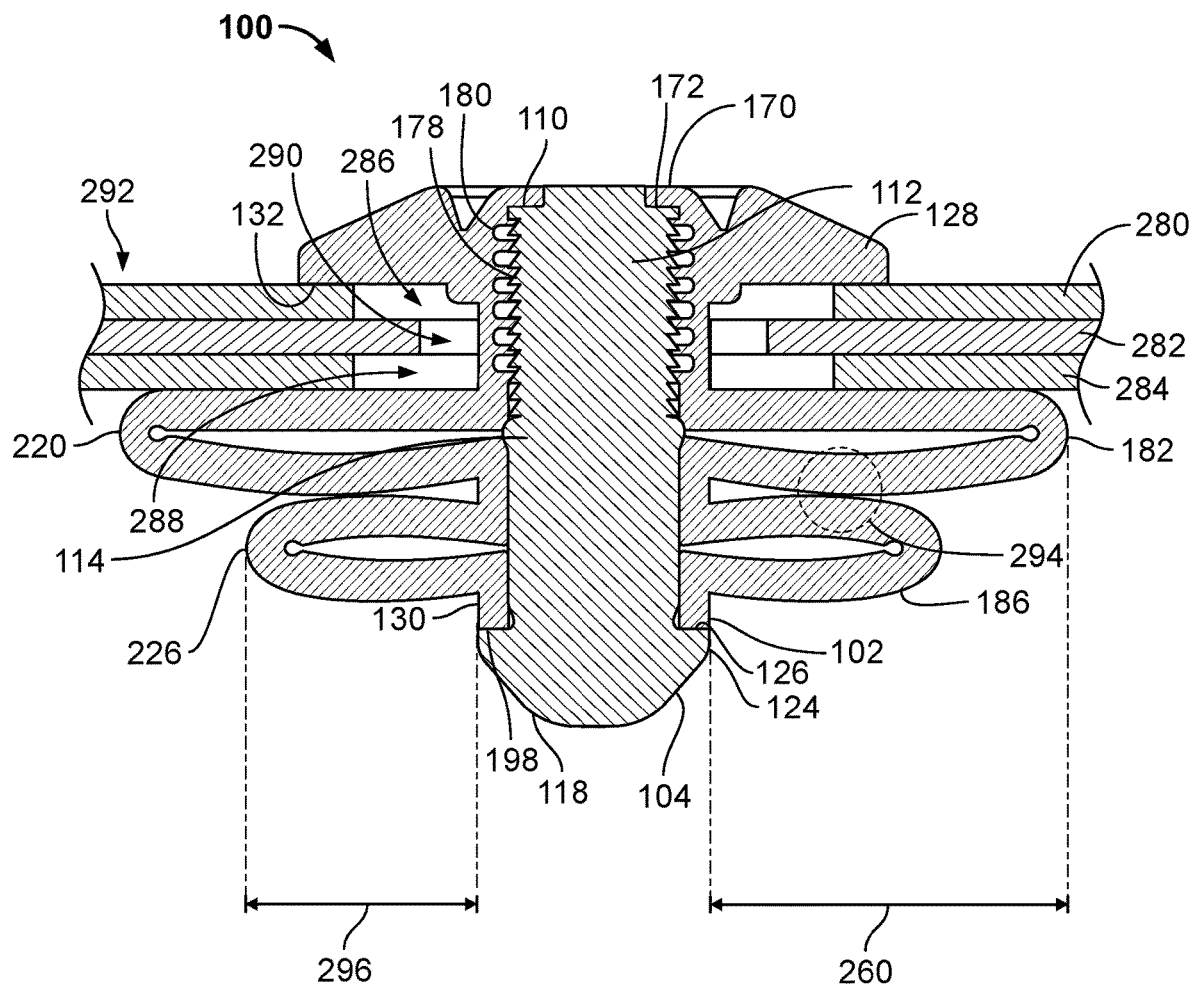
FIG. 19 is a cross-sectional view taken along lines 19-19 of FIG. 18.

Turning to FIGS. 17-19, a fastener assembly 100 is shown in cooperation with a first component 280, a second component 282, and a third component 284, wherein the fastener assembly 100 fastens or secures the first component 280, the second component 282, and the third component 284 together. The fastener assembly 100 shown in FIGS. 17-19 is shown in the fourth assembled state, with the ledge 110 in contact with the interior surface 172 of the collar stop 170 and the securing section 112 in cooperation with the grooves 180 (see FIG. 19). Further, in this particular embodiment, the first set of legs 182 and the second set of legs 186 are fully folded. With particular reference to FIG. 19, the first component 280 and the third component 284 have holes or apertures 286, 288, respectively, with a first diameter and the second component 282 has a hole or aperture 290 with a second diameter that is different than the first diameter of the apertures 286, 288. As such, FIG. 19 is an example wherein the fastener assembly 100 may be used to fasten together components having holes of varying sizes.

After clamping the first component 280, the second component 282, and the third component 284 together, a load 292 may be exerted onto the first component 280. Subsequently, the load 292 may be transferred to the first set of legs 182 and, thereby, cause the first set of legs to bend onto locations 294 of the second set of legs 186. That is, if a load is applied to the first component 280, the first set of legs 182 may bend into or onto a location along the second set of legs 186 (e.g., location 294) upon exertion of the load 292. The second set of legs 186 may also change the bending fulcrums of the first set of legs 182 by distributing the load 292 along a folded distance or span 296 of the second set of legs 186 (see FIGS. 17 and 19).

Figure 20:
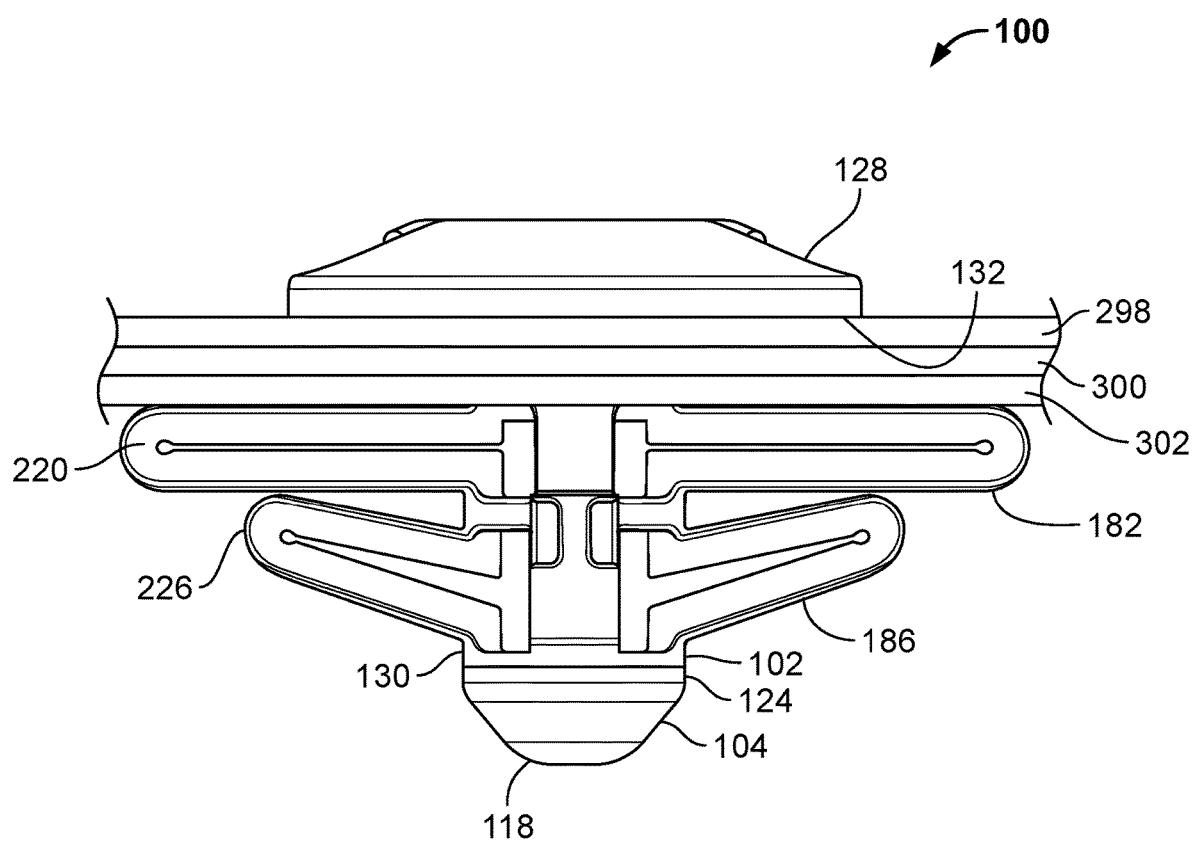
FIG. 20 depicts an alternative embodiment of the fastener assembly of FIG. 3 in cooperation with a first, second, and third component and after the pin has been pulled fully upward, in relation to the rivet body, and segmented.

As discussed above, in some embodiments, the ledge 110 of the pin 104 may be proximate a location along the pin 104 so that the second set of legs 186 (or the first set of legs 182) are V-shaped, or have an angled bend. As an illustrative example, FIG. 20 depicts a fastener assembly 100 that secures a first component 298, a second component 300, and a third component 302 together, wherein the second set of legs 186 have an approximately 25 to 45 degree bend.

If desired, the fastener assembly 100 may also include one or more features that allow for quick and easy servicing. For example, as previously discussed herein, the fastener assembly 100 may include one or more slots 148 and one or more tabs 150 positioned within the slots 148. In these embodiments, the slots 148 may be tool-engagement channels formed through the beveled surface 138 of the collar 128 and are configured to receive operative portions of a tool (e.g., a needle nose pliers). During operational use, a user may insert an operative portion of a tool into the slots 148 and remove the tabs 150. After the tabs 150 are removed, a retention pressure may be released from the pin 104. For example, the tabs 150 may be coupled to structures, such as a threaded interface (e.g., the internal threads or grooves 180) that securely couple the pin 104 to the rivet body 102, and removal of the tabs 150 may increase a diameter D6 of the interior channel 174 and may decouple the internal threads or grooves 180 and the securing section 112 of the pin 104. As such, the pin 104 may be pushed in and the first and second set of legs 182, 186 may unfold, allowing the fastener assembly 100 to be removed from the first, second, and third component 298, 300, 302.

As previously noted herein, slots and tabs that may be used in connection with the fastener assembly 100 are disclosed in in PCT/US2017/041636.

While various spatial and directional terms, such as top, bottom, lower, mid, lateral, horizontal, vertical, front, rear, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

The entire disclosure of each patent and publication cited herein is incorporated by reference, as if each such patent or publication were individually incorporated by reference herein.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:
1. A rivet fastener assembly configured to securely clamp together one or more components, the rivet fastener assembly comprising:
   a pin including a longitudinal shaft having a first diameter, a ledge and a securing section each having a second diameter that is greater than the first diameter, a bulbous rim having a third diameter that is greater than the second diameter, and a head with a circumferential lip having a fourth diameter that is greater than the third diameter; and
   a rivet body including a collar having an outer surface, a column that extends from an inner surface of the collar to a lowermost edge of the column, and an internal passage defined through the collar and the column, and
   wherein the column comprises a first set of legs configured to fold and directly contact the one or more components when folded, and a second set of legs configured to fold and reinforce the first set of legs when folded,
   wherein the collar comprises:
   (i) a collar stop comprising an annular groove defined between an outer wall and a flexible interior wall and surrounding an annular wall that extends radially inward from the interior wall, with the annular wall including an interior stop surface and defining a first opening having a diameter that is greater than the first diameter of the pin and less than the second diameter of the pin,
   (ii) a reciprocal securing section that is positioned between the collar stop and the first set of legs and comprises a plurality of internal annular grooves configured to reversibly interlock with the securing section of the pin, and
   wherein the pin is configured such that a bottom surface of the circumferential lip contacts the lowermost edge of the column.

2. The rivet fastener assembly of claim 1, wherein the pin is configured such that the bottom surface of the circumferential lip is shaped as a flange and is positioned flush against the lowermost edge of the column.

3. The rivet fastener assembly of claim 2, wherein the pin is configured such that the bottom surface of the circumferential lip applies a compressive force to the lowermost edge of the column, the compressive force sufficient to fold the first set of legs and the second set of legs.

4. The rivet fastener assembly of claim 1, wherein the ledge is configured to engage the collar stop and the collar stop is configured to provide a positive locating feature for the pin, once assembled.

5. The rivet fastener assembly of claim 1, wherein the internal passage has a substantially uniform diameter along the entire length of the column.

6. The rivet fastener assembly of claim 1, wherein the collar further comprises:
   (iii) a slot in the outer surface of the collar and a removable tab positioned within the slot and extending into the annular groove, and
   wherein the slot and the removable tab are configured such that the removable tab has an installed configuration and a removed configuration.

7. The rivet fastener assembly of claim 6, wherein the removable tab is configured to apply a retention pressure to the pin when in the installed configuration, and
   wherein the removable tab does not apply the retention pressure to the pin when in the removed configuration.

8. The rivet fastener assembly of claim 7, wherein the removable tab is configured to apply the retention pressure to the pin indirectly, and
   when in the installed configuration the removable tab is configured to apply the retention pressure to the reciprocal securing section of the collar.

9. The rivet fastener assembly of claim 8, wherein the removable tab does not apply the retention pressure to the reciprocal securing section when in the removed configuration, and
   wherein the diameter of the internal passage is greater when the removable tab is in the removed configuration than when the removable tab is in the installed configuration.

10. The rivet fastener assembly of claim 9, wherein the column and the pin are configured to allow the pin to be removed from the column when the removable tab is in the removed configuration.

11. A rivet fastener assembly configured to securely clamp together one or more components, the rivet fastener assembly comprising:
   a pin including a longitudinal shaft having a first diameter, a ledge having a second diameter that is greater than the first diameter, a bulbous rim having a third diameter that is greater than the second diameter, and a head with a circumferential lip having a fourth diameter that is greater than the third diameter; and
   a rivet body including a collar having an outer surface, a column that extends from an inner surface of the collar to a lowermost edge of the column, and an internal passage defined through the collar and the column, and
   wherein the collar comprises a collar stop with a diameter that is greater than the first diameter of the pin and less than the second diameter of the pin,
   wherein the column comprises a first set of legs with a first set of radial gaps therebetween, each first leg in the first set of legs comprising a set of linear beams and an intermediate section positioned therebetween, wherein each intermediate section comprises at least one feature selected from the group consisting of (i) a bulge that extends radially outward, (ii) a cross-sectional thickness that is less than a cross-sectional thickness of the linear beams, and (iii) a width that is less than a width of the linear beams, and wherein the first set of legs are configured to fold and directly contact the one or more components when folded,
   and a second set of legs with a second set of radial gaps therebetween, each second leg in the second set of legs comprising a set of linear beams and an intermediate section positioned therebetween, wherein each intermediate section comprises at least one feature selected from the group consisting of (i) a bulge that extends radially outward, (ii) a cross-sectional thickness that is less than a cross-sectional thickness of the linear beams, and (iii) a width that is less than a width of the linear beams, and wherein the first set of legs are configured to fold and reinforce the first set of legs when folded,
   wherein the intermediate sections of the first set of legs are more flexible than the intermediate sections of the second set of legs, and
   wherein the pin is configured such that the bulbous rim pre-flexes the first and second sets of legs and a bottom surface of the circumferential lip contacts the lowermost edge of the column.

12. The rivet fastener assembly of claim 11, wherein the pin is configured such that the bottom surface of the circumferential lip applies a compressive force to the lowermost edge of the column, the compressive force sufficient to fold the first set of legs and the second set of legs.

13. The rivet fastener assembly of claim 12, wherein the bottom surface of the circumferential lip of the pin is shaped as a flange.

14. The rivet fastener assembly of claim 13, wherein the column comprises a second opening opposite the first opening, and
   wherein the fourth diameter of the bottom surface of the circumferential lip greater than a diameter of the second opening.

15. The rivet fastener assembly of claim 11, wherein the pin comprises a securing section having the second diameter and the collar comprises a reciprocal securing section that is positioned between the collar stop and the first set of legs.

16. The rivet fastener assembly of claim 15, wherein the collar comprises a slot in the outer surface of the collar and a removable tab positioned within the slot and extending into an annular groove in the outer surface of the collar,
   wherein the slot and the removable tab are configured such that the removable tab has an installed configuration and a removed configuration,
   wherein the removable tab is configured to apply a retention pressure to the pin when in the installed configuration and the removable tab does not apply the retention pressure to the pin when in the removed configuration.

17. The rivet fastener assembly of claim 16, wherein the removable tab does not apply the retention pressure to the reciprocal securing section when in the removed configuration.

18. A rivet fastener assembly configured to securely clamp together one or more components, the rivet fastener assembly comprising:
   a pin including a longitudinal shaft having a first diameter, a ledge and a securing section each having a second diameter that is greater than the first diameter, a bulbous rim having a third diameter that is greater than the second diameter, and a head with a circumferential lip having a fourth diameter that is greater than the third diameter; and
   a rivet body including a collar having an outer surface, a column that extends from an inner surface of the collar to a lowermost edge of the column, and an internal passage defined through the collar and the column, and
   wherein the collar comprises:
   (i) a collar stop comprising an annular groove defined between an outer wall and a flexible interior wall and surrounding an annular wall that extends radially inward from the interior wall, with the annular wall including an interior stop surface and defining an opening having a diameter that is greater than the first diameter of the pin and less than the second diameter of the pin,
(ii) a reciprocal securing section that is positioned proximate the collar stop and comprising a plurality of internal annular grooves configured to reversibly interlock with the securing section of the pin,
wherein the column comprises a first set of legs with a first set of radial gaps therebetween, each first leg in the first set of legs comprising a set of linear beams and an intermediate section positioned therebetween, wherein each intermediate section comprises at least one feature selected from the group consisting of (i) a bulge that extends radially outward, (ii) a cross-sectional thickness that is less than a cross-sectional thickness of the linear beams, and (iii) a width that is less than a width of the linear beams, and wherein the first set of legs are configured to fold and directly contact the one or more components when folded,
and a second set of legs with a second set of radial gaps therebetween, each second leg in the second set of legs comprising a set of linear beams and an intermediate section positioned therebetween, wherein each intermediate section comprises at least one feature selected from the group consisting of (i) a bulge that extends radially outward, (ii) a cross-sectional thickness that is less than a cross-sectional thickness of the linear beams, and (iii) a width that is less than a width of the linear beams, and wherein the first set of legs are configured to fold and reinforce the first set of legs when folded,
wherein the intermediate sections of the first set of legs are more flexible than the intermediate sections of the second set of legs, and
wherein the pin is configured such that the bulbous rim pre-flexes the first and second sets of legs and a bottom surface of the circumferential lip contacts the lowermost edge of the column.

19. The rivet fastener assembly of claim 18, wherein the collar comprises a slot in the outer surface of the collar and a removable tab positioned within the slot and extending into the annular groove.

20. The rivet fastener assembly of claim 18, wherein the column comprises a second opening opposite the first opening, and
wherein the bottom surface of the circumferential lip of the pin is shaped as a flange has a fourth diameter that is greater than a diameter of the second opening.

* * * * *